United States Patent
Mussini

(10) Patent No.: US 7,386,862 B2
(45) Date of Patent: Jun. 10, 2008

(54) PROCESS FOR ALLOWING APPLETS TO BE RESIZED INDEPENDENTLY FROM THE WEB/HTML PAGE THEY WERE CREATED

(75) Inventor: Marco Mussini, Milan (IT)

(73) Assignee: Alcatel, Paris (FR)

( * ) Notice: Subject to any disclaimer, the term of this patent is extended or adjusted under 35 U.S.C. 154(b) by 532 days.

(21) Appl. No.: 10/464,658

(22) Filed: Jun. 19, 2003

(65) Prior Publication Data
US 2004/0212635 A1 Oct. 28, 2004

(30) Foreign Application Priority Data
Jul. 5, 2002 (EP) .................................. 02291705

(51) Int. Cl.
G06F 9/00 (2006.01)
(52) U.S. Cl. .................... 719/320; 345/620; 345/622; 345/629
(58) Field of Classification Search ................ 715/513; 719/318, 320; 345/620, 622, 629
See application file for complete search history.

(56) References Cited

U.S. PATENT DOCUMENTS 6,401,134 B1 * 6/2002 Razavi et al. ............... 719/310

2001/0043235 A1 * 11/2001 Best et al. ................... 345/781

FOREIGN PATENT DOCUMENTS

EP 0 893 758 A2 1/1999

* cited by examiner

Primary Examiner—William Thomson
Assistant Examiner—Phuong N Hoang
(74) Attorney, Agent, or Firm—Sughrue Mion, PLLC

(57) ABSTRACT

The present invention provides for a method for allowing Applets to be resized independently from the WEB/HTML page they were created. The Applet is made "detachable", from a user's point of view, from the WEB/HTML page it was initially created. Pushing a "detach" button creates a floating, independent window, extracts the Applet and places it in that new window. In the original Applet area, a "dock" button is displayed. After this transformation, it will be possible to move and resize the "independent Applet window" at will. However, by pushing the "dock" button, it is still possible to perform the opposite operation, i.e. to "dock" the Applet back on the original location, the WEB/HTML page.

18 Claims, 1 Drawing Sheet

PROCESS FOR ALLOWING APPLETS TO BE RESIZED INDEPENDENTLY FROM THE WEB/HTML PAGE THEY WERE CREATED

INCORPORATION BY REFERENCE OF PRIORITY DOCUMENT

This application is based on and claims the benefit of the European Patent Application No. 02 291 705.8 filed on Jul. 5, 2002, which is incorporated by reference herein.

BACKGROUND OF THE INVENTION

1. Field of the Invention

The present invention relates to a process for allowing Applets to be resized independently from the WEB/HTML page they were created.

2. Description of the Prior Art

Java™ programs can be designed for deployment in one of two known run-time configurations: Application or Applet.

Application is the traditional way to deploy software, with an explicit installation phase where all necessary program files and configuration files are copied, with a well-defined tree organization, on the mass storage of the target run-time system, and then several execution phases where control is transferred to the entry point of the application which begins operating as designed.

This deployment scheme has the following pros and cons:

Since program files are permanently stored on the target machine, application startup is immediate.

To start the application, a specific, explicit command must be issued by the user.

When the application starts, it is usually independent from other applications, i.e. its lifetime is not necessarily correlated to other applications' lifetime.

Space is permanently occupied on each target machine's mass storage for holding program files and configuration files.

When a new version of the program is released, in order to update the program on the target machine, another installation procedure must be done, either integral or differential/incremental [upgrade].

Applet deployment, on the other hand, has a different goal, and as a consequence of this, it differs from the previous scenario in many respects:

Applet code does not reside permanently on mass storage of the target run time system. It is stored on the mass storage of a centralized server, from which it is downloaded every time the Applet is started. This greatly simplifies administration of the target machines. If a new version of the software is released, it is not necessary to reinstall it on all target machines: it is sufficient to reinstall it on the centralized server and all target machines will download the new version at the first occasion. In situations where the same application must run on hundreds of target machines, this is a tremendous advantage over traditional installation scheme.

The Applet appears to the user as "embedded" in a WEB/HTML page, and it is transparently downloaded (from the centralized server) and activated (when download is complete) during a web browsing session without explicit commands.

Download prior to activation takes time, therefore, execution start cannot be immediate.

One or more Applets run "in" a web browser process (though possibly in several windows). When the web browser exits, all Applets also terminate, and their program files and configuration files, which were previously downloaded by the web browser, are "forgot" (unless caching is used to achieve long-term persistency of already downloaded program files).

One possible way to fulfill a frequent technical requirement coming from users, like customers of a telecommunication network management system, i.e. to make GUI (Graphic User Interface) applications accessible via web, without any prior installation on the client machine other than operating system and web browser, is to develop them as Java Applets. This is especially useful when applications are accessed and activated remotely.

Unfortunately, when GUI applications are running as Java Applets, their size is determined by the WEB/HTML page where the Applet is embedded and cannot be modified by the user like it is normally possible for any other window. Only the web browser window can be resized, but the Applet area within the WEB/HTML page cannot grow. Furthermore, Applets are hosted in a different window (i.e. the browser's one), with its own menus and toolbars, and no possibility to alter or enrich their populations with Applet-provided menus. This renders the development of GUI applications not optimized in time and computer resourses.

More in details, software deployed in Applet mode appears to the final user like "embedded" in the web page contents. Although this visual effect may be desirable from a general point of view, there is an important drawback.

The size reserved to an Applet in a web page is fixed and pre-determined. For example, if we have a "word processor" Applet embedded in a web page, it could have been decided to reserve in the web page an area of W pixels wide and H pixels tall for its graphical interface.

Since the web page may be accessed from a number of clients, and these clients might have different screen sizes/resolution, the web page must be designed to make sure that it is possible to use the word processor Applet effectively on all clients, in particular, even on clients with the smallest screen.

For this reason, quite low values are usually selected for W and H (for example, 600×400 pixels), resulting in Applet sizes which are compatible with all target machine situations, but hardly optimal for target machines equipped with large, high-resolution screens (say, 1600×1200 pixels). On these machines, the word processor Applet will appear as a tiny area less than one fourth of the total available screen size, even if the user has no other application running at the moment.

With traditional applications, in this situation, the user would use window controls to maximize the window size, in order to use all available screen space to work more effectively.

With Applets, this is not possible, because Applet size cannot be changed. The size is "hardwired" in the WEB/HTML code of the web page which is "hosting" the Applet.

The above remarks explain the "Applet size" problem. Other problems exist, however; for example, "Applet multiwindowing". This is the possibility to manage Applets just like ordinary applications, i.e. to have one independent window for each running instance of the software, which can be iconified, moved, sent to the background or brought to the foreground, . . . Applets do not have this flexibility, as they are embedded in web pages, and the best that can be done is to manage them through the web browser window which is displaying the web page which is hosting them. However this is not natural for the final user, it wastes screen space (the window usually carries as an overhead with it all menus of the web browser and the web page area around the Applet).

Therefore, while preserving the advantages connected to Applet-based software deployment and execution, there is the need to have a system to make it possible to resize Applets and to make them top-level windows.

Since Applets cannot change their size, but the surrounding WEB/HTML page can, usual known workarounds for the "Applet resize problem" include:

- making Applet size as big as possible in the web page; or
- use hybrid techniques to take advantage of the fact that the HTML is portion of the page can be resized; therefore, design the GUI so that only part of it is "active", with fixed size, and implemented in Java, and everything else is in HTML, possibly with JavaScript; or
- configure the Applet as zero-size and open a secondary window.

However any a-priori choice about the Applet size cannot be adequate for all circumstances (there are constraints about the display size to take into account, too). Exploiting a mix of Java, HTML and JavaScript is not applicable to complex GUIs, makes application development harder and exposes the overall application behavior and appearance to variance in web browser features. The third solution is only partly acceptable because the connection between the Applet window and the web page is not evident, and the Applet can only run in the secondary window, even in case the user prefers to run it as a traditional Applet.

Other possible known solutions could be:

- Design several web pages, for example one for small screens, one for medium screens, one for large screens, and reserve different Applet sizes in each situation; then ask the user to select the most appropriate web page for his/her screen resolution, or try to make this selection process assisted or semi-automatic. In any case, this does not solve the "Applet multiwindowing" problem.
- Design the Applet so that although it is still actually embedded in the web page, from a lifetime point of view, its GUI is managed as an external (thus resizable, etc . . . ) window. This solves both problems, but the "Applet embedded in the web page" concept, which is appropriate and desirable in many situations, is lost.

SUMMARY OF THE INVENTION

Therefore in view of the known solutions, that are not quite efficient, it is the main object of the present invention to provide a process for allowing Applets to be resized independently from the WEB/HTML page they were created.

The basic idea of the present invention is that the Applet is made "detachable", from a user's point of view, from the WEB/HTML page it was initially created. Pushing a "detach" button creates a floating, independent window, extracts the Applet and places it in that new window. In the original Applet area, a "dock" button is displayed. After this transformation, it will be possible to move and resize the "independent Applet window" at will. However, by pushing the "dock" button, it is still possible to perform the opposite operation, i.e. to "dock" the Applet back on the original location, the WEB/HTML page. It is also possible to specify that the Applet should automatically start as detached as soon as the HTML page is loaded.

This allows to overcome the intrinsic graphical limitation of Applets, and allows to get a number of advantages.

It is possible to design all Applet software so that its GUI can run indifferently as embedded in the WEB/HTML page or as a detached window. Selection of the appearance is possible not only at Applet startup time, but even at run time, i.e. the Applet might start as embedded in the web page, and later detached from it as an independent window when the user decides he/she needs more window flexibility to work more effectively with the application (for example, in a drawing application, when the picture being drawn becomes too large to fit in the initially small Applet size).

The solution is transparent to application code; application is implemented in 100% Java code, therefore its appearance has no dependencies from browser oddities; Applet can be docked back on the web page (i.e. the "detach" operation is reversible); Applet is perceived as a true Applet with the added value of being detachable from the WEB/HTML page; an evident connection between the original Applet area and the independent window is established both on screen and in user's perception.

These and further objects are achieved by means of the process as described in the attached claims, which are considered an integral part of the present description.

BRIEF DESCRIPTION OF THE DRAWINGS

The invention will become fully clear from the following detailed description, given by way of a mere exemplifying and non limiting example, also with reference to the attached drawing figure, wherein the appearance of the detached Applet page is shown.

BEST MODE FOR CARRYING OUT THE INVENTION

Figure 1:
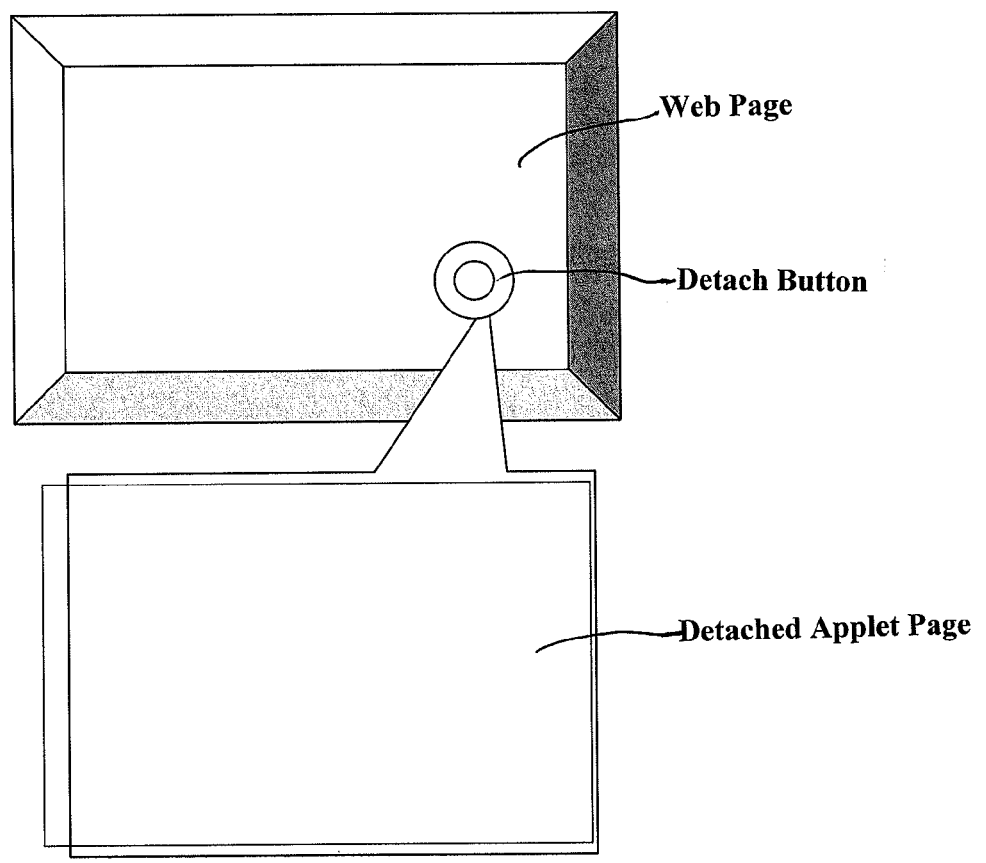

As known, an Applet can be in two different states: "docked", when it is nested in its original WEB/HTML page; and "detached", when it is nested in an independent window floating outside that page.

According to an aspect of the invention, a wrapper class M is created which fully takes care of the dock/detach activities. The wrapper class M derives from JApplet, which is a known extended version of Applet. As it is known, programming by objects means that the application is made by class instances, where a class defines data and methods to handle and access the associated data.

The wrapper class M:

- creates and manages a "detach" button;
- when the detach button is pressed, it creates an independent window, transfers the Applet contents to it, and leaves a "dock" button in the Applet area;
- when the "dock" button is pressed, or the independent window is closed, it disposes the secondary window, transfers all of its contents back to the Applet area, and removes the "dock" button itself;
- at startup time, if "start up as detached" mode is activated by the parameters present in the WEB/HTML page, performs the "detach" operation automatically.

The application main class simply derives from this wrapper class M.

In order to intercept all add/remove operations on the JApplet contents, the getContentPane( ) method of the JApplet class is overridden in the wrapper class M so that it returns not the contentPane, but rather another panel, "pseudo contents pane", which is under control of special handling methods defined by the wrapper class M.

Thanks to this mediation, the wrapper class M is able to decide whether the "pseudo content pane" has to be placed in its typical position (i.e. in the web page; in this case it is placed as a child of the original content pane), or in its "detached" position (in this case it is placed as a child of the content pane of a JFrame).

The Applet code has the illusion of dealing with the "usual" content pane, but it is instead dealing with the pseudo contents pane.

In the docked state, the wrapper class M adds a detach button on top of the pseudo contents pane; this button has an attached callback which performs the necessary steps to detach the Applet (see below).

In the detached state, the wrapper class M associates to the "window close" event a callback which will dock the pseudo contents pane back in the usual place.

The following section describes the transition between the two states. Docked to Detached:
  remove pseudo contents pane from JApplet's content pane
  create JFrame
  add pseudo contents pane to JFrame's content pane
  associate to "JFrame close" event a callback to run the "Detached to Docket" code.
  add a button to the space left empty in the JApplet area and associate the same callback to this button. (clicking on this button will dock the Applet back, just like closing the window)
  make the JFrame visible
  Detached to Docked:
  remove the pseudocontentpane from the JFrame
  add the pseudocontent pane to the JApplet's content pane
  hide the JFrame.

Further implementation details will not be described, as the man skilled in the art is able to carry out the invention starting from the teaching of the above description.

There has thus been shown and described a novel process for allowing Applets to be resized independently from the WEB/HTML page they were created, which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method for allowing an applet to be resized independently from a page where the applet was created, the method comprising:
  detaching the applet, from a user's point of view, from the page in which the applet was created; said detaching comprises:
    creating a floating, independent window;
    extracting the applet; and
    placing the applet in the independent window,
  wherein the applet is configured to be resized in the created window,
  wherein the detaching of the applet is executed by replacing an original method in a JApplet class with a pseudo method,
  wherein applet code executing the applet as an illusion of dealing with the original method when the applet code is dealing with the pseudo method that executes the detaching.

2. The method according to claim 1, further comprising docking the applet back into the page, wherein the docking comprises closing the independent window and transferring the content of the applet from the independent window back into the applet within the page.

3. The method according to claim 2, wherein said detaching and docking is executed by a wrapper class derived from the JApplet class, and wherein the wrapper class executes the following operations:
  in order to intercept add/remove operations on contents of JApplet class, an original content pane method of the JApplet class is overwritten in the wrapper class so that a pseudo contents pane panel is returned as a mediation instead of the original content pane method, where said pseudo contents pane panel is under control of handling methods defined by the wrapper class; and
  decides whether the pseudo content pane panel has to be placed in a docked position or in a detached position; thereby Applet code has an illusion of dealing with the original content pane method when the Applet code is dealing with the pseudo contents pane panel.

4. A process according to claim 3, wherein, in the docked position, the wrapper class adds a detach button on top of the pseudo contents pane panel, said button having an attached callback which performs operations to detach the applet, and wherein, in the detached state, the wrapper class associates to a window close event, which is a callback which docks the pseudo contents pane panel back into the page as a child of the original content pane method.

5. A process according to claim 4, wherein for transitions between the docked position to the detached position, the wrapper class executes the following operations:
  removes said pseudo contents pane panel from the JApplet's content;
  creates a JFrame;
  adds said pseudo contents pane panel to JFrame's content;
  associates to JFrame close event a callback to run detach to dock code;
  adds a button to space left empty in the JApplet and associate the callback to this button;
  makes the JFrame visible; and
  wherein for transitions between the detached position to the docked position, the wrapper class executes the following operations:
    removes the pseudo content pane panel from the JFrame;
    adds the pseudo content pane panel to the JApplet's content pane; and
    hides the JFrame.

6. The method according to claim 2, wherein the detaching of the applet further comprises a user pressing a detach button, and wherein the docking of the applet further comprises a user pressing a dock button appearing in the created window.

7. The method according to claim 3, wherein the docked position comprises a position in which the pseudo content pane panel is in the page as a child of the original content pane method and wherein the detached position comprises a position in which the pseudo content pane panel is placed as a child of a content pane of a JFrame.

8. The method according to claim 1, further comprising docking the applet.

9. The method according to claim 8, wherein said detaching and docking of the applet is executed by a wrapper class derived from the JApplet class.

10. The method according to claim 9, wherein the wrapper class creates and manages a first user interface for detaching the applet so that when input to detach the applet on said user interface is received, the detaching is executed and a second user interface for docking the applet is provided within the applet.

11. The method according to claim 10, wherein the wrapper class creates and manages the second user interface for docking an applet whose contents were transferred to the floating, independent window so that when input to dock the applet on said second user interface is received, a) closing the created window, b) transferring the content of the applet from the created window back to the applet within the page, and c) removing the second user interface.

12. The method according to claim 11, wherein the page is a Web or HTML page, wherein the first user interface is a detach button and wherein the second user interface is a dock button, and wherein said user input comprises one of clicking the detach or dock button and closing the created independent window.

13. The method according to claim 1, wherein, when a detach mode is present in the page at a start up, the detaching is automatically performed prior to loading the page and wherein, when a docked mode is present in the page at the start up, the detaching is not performed prior to loading the page and the applet is displayed in the page.

14. The method according to claim 1, wherein said detaching of the applet is executed by a wrapper class and wherein said wrapper class creates and manages a detach button.

15. The method according to claim 14, wherein the wrapper class creates and manages a dock button and wherein, when the dock button is pressed, contents of the applet are transferred back into the page.

16. The method according to claim 1, wherein said detaching is executed by a wrapper class derived from the JApplet class, and wherein the wrapper class executes the following operations:

detaching the applet by replacing an original content pane method of the JApplet class unrelated to said attaching and said detaching of the applet with a pseudo content pane method that executes the detaching, wherein the applet code has an illusion of dealing with the original content pane method when the applet code is dealing with the pseudo contents pane method.

17. The method according to claim 16, wherein the wrapper class decides whether the pseudo contents pane method will generate a child of the original content pane method of JApplet class or a child of a content pane of a JFrame class.

18. The method according to claim 1, wherein the pseudo method creates the illusion for the applet code that the applet code is dealing with the original method when the applet code is dealing with the pseudo method and wherein the original method is unrelated to the detaching and attaching of the applet.

* * * * *